A. MOON.
SPRING WHEEL.
APPLICATION FILED JAN. 31, 1917.
1,316,499.
Patented Sept. 16, 1919.
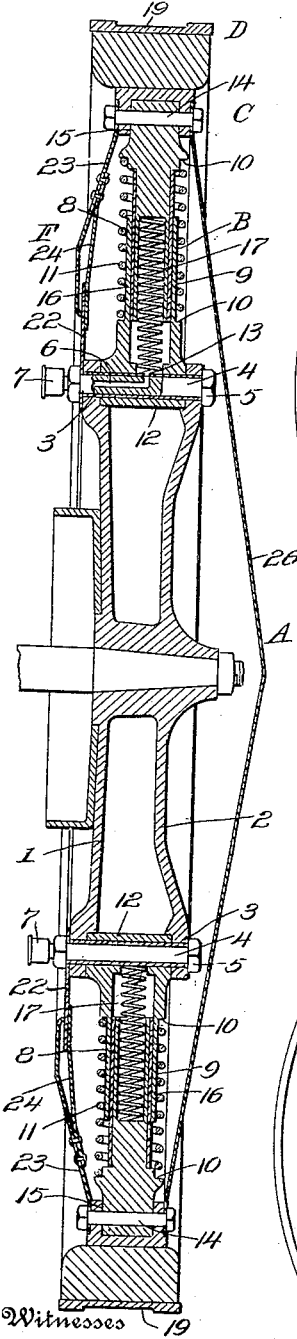
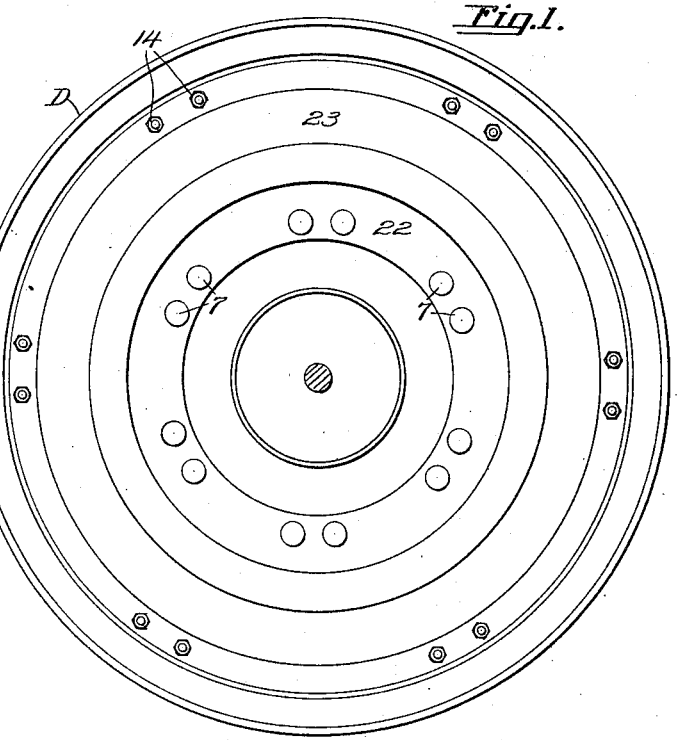
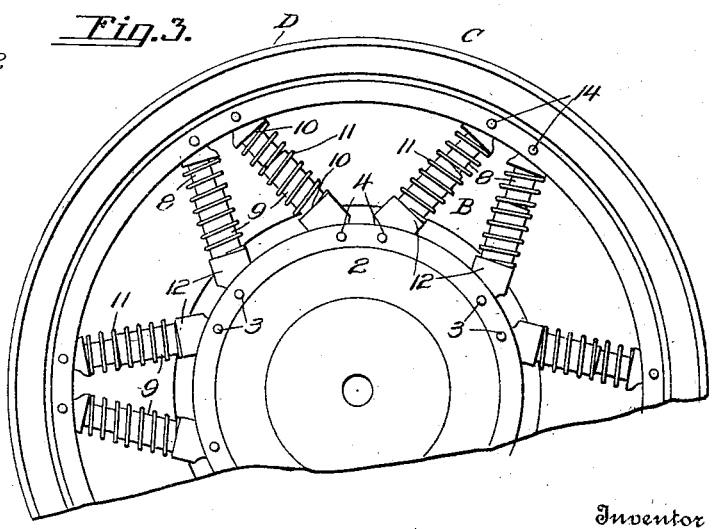
Inventor
Arch Moon.
By Victor J. Evans
Attorney
Witnesses
F. L. Gibson
Edwin Doult

UNITED STATES PATENT OFFICE.

ARCH MOON, OF ELTOPIA, WASHINGTON.

SPRING-WHEEL.

1,316,499.  Specification of Letters Patent.  Patented Sept. 16, 1919.

Application filed January 31, 1917. Serial No. 145,724.

*To all whom it may concern:*

Be it known that I, ARCH MOON, a citizen of the United States, residing at Eltopia, in the county of Franklin and State of Washington, have invented new and useful Improvements in Spring-Wheels, of which the following is a specification.

This invention relates to resilient wheels and has particular application to a spring wheel, the chief characteristic of the invention residing in the provision of a device of this character comprising resilient compressible spokes which are arranged in pairs to movably connect the felly with the hub, the spokes in each pair being inclined in opposite directions to prevent the hub from rotating within the felly.

Another characteristic of this invention resides in the provision of a device of this character having a cover for the resilient spokes to thoroughly protect the same under all conditions, the cover being of novel construction to permit the expansion and contraction of the spokes and thus not interfering with the resiliency of the wheel.

Another object of this invention is to provide a device of this character having means for lubricating the reciprocating part of the spokes, thus limiting the friction and reducing the wearing of the parts to a minimum.

Another object of the invention is to provide a hub of simple and efficient construction for substantially supporting the spokes and for preventing accidental lateral movement thereof.

Other objects of the invention will appear as the specification is read in connection with the accompanying drawings, in which:—

Figure 1 is a side elevation of the wheel showing the improved form of extensible cover;

Fig. 2 is a sectional view of Fig. 1;

Fig. 3 is a side elevation of the wheel showing the integral cover removed.

Referring to the drawings in detail, my invention comprises a hub generally indicated as at A, which in this instance is provided with a pair of annular extending flanges 1 and 2 which are arranged in substantially parallel spaced relation to each other and which have their outer edges provided with alined openings 3 arranged at spaced intervals in pairs as is clearly shown in Fig. 3. Pivotally mounted within the openings 3 and arranged between the flanges 1 and 2 are my improved form of resilient spokes indicated at B. The spokes each have one end thereof secured between the flanges by means of the shaft 4, the opposite extremities of said shaft are threaded and provided with nuts 5 whereby the shaft will be locked upon the flanges as will be understood. In this instance I have shown each of the shafts formed with a substantially L-shaped bore 6 which extends from the inner end to the medial portion of the shaft, the inner end of the shaft being provided with an oil cup 7 which is in communication with the bore 6 whereby a lubricant can be fed from the cup to the interior of the sleeve as will be understood. It will be noted that the openings being arranged in pairs in intervals about the periphery of the flanges 1 and 2, the resilient spokes B which are pivotally mounted within the openings, will be arranged in pairs as is clearly shown in Fig. 3 of the drawings. The spokes B are so arranged about the hub A as to have one of the spokes of one pair inclined toward the adjacent spoke of the adjacent pair so that the spokes will be arranged in diverging pairs about the periphery of the hub. The outer ends of the spokes are pivotally connected to the felly C and thus it will be evident that the spokes will be secured in diverging relation to each other at all times. The spokes B each comprise in this instance an outer member 9, the inner member telescopically receiving the outer member, and each of the members being provided with annular shoulder 10 between which is interposed the coiled retractile spring 11 whereby the sections will normally remain in projected position. The inner member is of annular formation and has its inner end provided with a transverse extending bearing 12, in which is mounted the shaft 4 to support the inner member between the flanges 1 and 2 of the hub. The outer wall of the bearing 12 is provided at its medial portion with an opening 13 which communicates with the interior of the inner member 8 and is further adapted to form a communication between the bore 6 of the shaft 4 whereby the lubricant may be fed into the inner member as will be understood.

The inner member 8 of each of the spokes has its outer end pivotally mounted by means of a bolt 14 between the parallel flanges of the felly C, it being noted that the felly is substantially U-shaped in cross section to provide the flanges 15. The inner end of the outer member 9 is of cylindrical formation for a portion of its length to provide the annular collar 16, in which is mounted one end of a coil retractile spring 17, the opposite ends extending into the inner member 8 and through the opening 13 to engage the shaft 4, thus aiding the spring 11 to keep the members in retracted or extended position. Interposed between the confronting ends of the inner and outer members 9 and carried by the outer member 9 is a sleeve bearing 8 which is adapted to engage the confronting faces of the inner and outer members so as to reduce the amount of wear between the parts to a minimum.

It will be seen from the foregoing construction that I have provided a spoke formed with telescopic sections, the sections being resiliently supported in extended position whereby upon movement of the felly toward the hub of the wheel, the springs interposed between the members or sections of the spokes will serve to prevent the hub from receiving the full impact of the jar or movement of the felly when the latter strikes any irregularity in the rod. The spokes being arranged in their converging relation to each other, the springs upon the respective pairs of spokes will coöperate with each other to minimize the amount of jar between the felly and the hub thus producing a wheel which is highly resilient and furthermore brace the hub against turning within the wheel. It will be further noted owing to the fact that the sections or members of the spokes are pivotally mounted upon the felly and hub respectively, the spokes may be permitted to move laterally to a certain degree to automatically position themselves to receive the full impact of the movement of the felly.

Mounted upon the felly C is a metallic tire D which has its tread surface provided with a groove 19 whereby the skidding of the tire will be prevented. Although I have shown a metallic tire secured to the wheel, I wish it to be clearly understood that a tire of any description may be used without departing from the spirit and scope of this invention.

Referring more particularly to Fig. 1, I have shown an improved form of cover designated as at F which is composed of two sections 22 and 23, respectively, and the spring clip 24. The section 22 is in the form of a flat annular ring which is secured to the inner flange 1 my means of the shaft 4, the other extending through the ring adjacent its inner periphery, thereby disposing the major portion of the ring beyond periphery of the flanges 1 and 2. The section 23 is also of annular formation and has its outer periphery secured to the felly C by means of the bolts 14, and is bent transversely so as to dispose its inner edge or periphery upon the outer side of the section 22, the inner edge being provided with an inturned annular flange 25 which is adapted to engage the section 22 to hold the section 23 in spaced relation thereto. Secured to the inner face of the section 23 at regular spaced intervals is one end of the spring clips 24, the fixed clips being of such a length as to have free ends engaging the inner face of the section 22. It will be noted that the clips 24 have their medial portion arranged in spaced relation to the section 23 thereby forming a slot for the reception of the section 22 and to guide the latter when the sections are moved under the vibration of the wheel. It will be noted that the space between the clips and the section 23 is of a length greater that the relative movement of the sections whereby the sections will be prevented from striking each other and consequent bending or distorting of the same when the wheel is vibrated. It is to be understood that the sections 22 and 23 are arranged upon the inner side of the wheel to prevent the dust and foreign matter from getting into the reciprocating members of the spokes, while arranged upon the outer side of the wheel is a casing or cover 26 which is annular and of substantially cone shaped formation, the periphery of which is secured to the felly by means of the bolt 14 as is clearly shown in the drawings. The cover 26 is of such a diameter as to completely cover the outside of the wheel and has its apex disposed adjacent the axle of the hub whereby the free movement of the axle will not be prevented and all the mechanism within the wheel thoroughly protected at all times.

It will be evident from the foregoing that I have provided simple and efficient means for protecting the wheel from dust or other foreign matter and at the same time permitting the expansion or contraction of the spokes to accommodate the movement of the felly upon the hub.

It is thought from the foregoing taken in connection with the accompanying drawing that the construction and operation of my device will be apparent to those skilled in the art without further description, that minor changes in shape, size and proportion and minor details of construction may be made without departing from the spirit and scope of the appended claim.

What I claim is:—

A resilient wheel comprising a hub section, a felly section, resilient means connecting said sections together, an annular plate connected with the hub section, an annular plate connected with the felly section and provided with an inclined portion and a straight portion having an inturned edge engaging with the outer face of the plate on the hub section, and a third plate secured to the inner face of the inclined part and extending inwardly with its inner edge yieldingly engaging the inner face of the plate on the hub section.

In testimony whereof I affix my signature.

ARCH MOON.

Copies of this patent may be obtained for five cents each, by addressing the "Commissioner of Patents, Washington, D. C."